United States Patent
Anand et al.

(10) Patent No.: US 10,881,114 B2
(45) Date of Patent: Jan. 5, 2021

(54) TAPIOCA TORTILLA AND METHOD OF MAKING

(71) Applicant: General Mills, Inc., Minneapolis, MN (US)

(72) Inventors: Aarti Anand, Minneapolis, MN (US); Carina Claudia Cammarota, Navarra (ES); Xabier Murgui, Navarra (ES); Jonas Plaza Garcia, La Rioja (ES)

(73) Assignee: General Mills, Inc., Minneapolis, MN (US)

( * ) Notice: Subject to any disclaimer, the term of this patent is extended or adjusted under 35 U.S.C. 154(b) by 547 days.

(21) Appl. No.: 15/426,188

(22) Filed: Feb. 7, 2017

(65) Prior Publication Data
US 2018/0220661 A1 Aug. 9, 2018

(51) Int. Cl.
A21D 13/42 (2017.01)
A21D 13/22 (2017.01)
A21D 13/00 (2017.01)
A21D 2/00 (2006.01)
A21D 13/20 (2017.01)

(52) U.S. Cl.
CPC .............. *A21D 13/42* (2017.01); *A21D 2/00* (2013.01); *A21D 13/00* (2013.01); *A21D 13/20* (2017.01); *A21D 13/22* (2017.01)

(58) Field of Classification Search
CPC ........ A21D 13/42; A21D 13/20; A21D 13/22; A21D 13/00; A21D 2/00
See application file for complete search history.

(56) References Cited

U.S. PATENT DOCUMENTS

| | | | |
|---|---|---|---|
| 4,609,555 A * | 9/1986 | Becher | A21D 13/28 426/102 |
| 5,160,377 A | 11/1992 | Montemayor et al. | |
| 5,989,603 A | 11/1999 | Lonergan et al. | |
| 6,355,289 B1 | 3/2002 | Rolow et al. | |
| 8,347,808 B2 | 1/2013 | Belzowski et al. | |

(Continued)

FOREIGN PATENT DOCUMENTS

EP 2044843 4/2009
PH 26821 11/1992

OTHER PUBLICATIONS

Levy, Jillian. "Tapioca Flour:The Best 'Performing' Gluten-Free Flour" May 28, 2016 https://draxe.com/tapioca-flour/ (Year: 2016).*

(Continued)

*Primary Examiner* — Katherine D Leblanc
(74) *Attorney, Agent, or Firm* — Diederiks & Whitelaw, PLC; John L. Crimmins Esq.

(57) ABSTRACT

Tapioca tortillas are formed from creating tortilla bases from a first supply of tapioca and then topping the tortilla bases with a second supply of tapioca in the form of granules. With this arrangement, a lower or bottom surface of the tapioca tortilla is generally smooth, while an upper or top surface is undulated or textured. In a particularly preferred embodiment of the invention, the tortilla base is made from about: 55.72% tapioca; 35.94% water; 3.34% glycerin; 1.45% fine salt; 0.89% monoglycerides; 2.23% xanthan gum; 0.28% α-amylase; 0.10% potassium sorbate; and 0.05% citric acid, while the tapioca granules range in size, such as from 1 mm to less than 250 μm.

20 Claims, 3 Drawing Sheets

(56) References Cited

U.S. PATENT DOCUMENTS

| | | |
|---|---|---|
| 2005/0079269 A1 | 4/2005 | Baker et al. |
| 2006/0110496 A1* | 5/2006 | Dyer ..................... A21C 9/063 |
| | | 426/94 |
| 2009/0142465 A1* | 6/2009 | Sturkenboom .......... A21D 2/16 |
| | | 426/560 |
| 2009/0214732 A1 | 8/2009 | de Levita et al. |
| 2012/0288590 A1 | 11/2012 | Soane et al. |
| 2013/0243916 A1 | 9/2013 | Bright et al. |

OTHER PUBLICATIONS

"Blister" Retrieved May 12, 2019 https://dictionary.cambridge.org/us/dictionary/english/blister (Year: 2019).*
"Gluten Free Tortilla Recipe" Jun. 2, 2015 https://web.archive.org/web/20150603004827/https://nurturemygut.com/gluten-free-tortilla-recipe.html/ (Year: 2015).*
Luis Chel-Guerrero et al., "*Chemical, Rheological and Mechanical Evaluation of Maize Dough and Tortillas in Blends with Cassava and Malagna Flour*", Journal of Food Science and Technology, vol. 52, No. 7, 8, pp. 4387-4395, Aug. 8, 2014.
"Cook's Thesaurus: Thickeners" Dec. 19, 2016. http://web.archive.org/web/20161219162529/http://www.foodsubs.com/ThickenStarch.html.

* cited by examiner

US 10,881,114 B2

TAPIOCA TORTILLA AND METHOD OF MAKING

BACKGROUND OF THE INVENTION

The present invention pertains to the food art and, more particularly, the making of a tapioca tortilla including an added tapioca particulate topping.

Tapioca is a processed extract from a tropical plant. In Brazil, the plant is called the manioc plant. There are different kinds of manioc, with one being poisonous due to the existence of cyanide. When this poisonous type of manioc is processed so as to be detoxified, tapioca starch is one resulting product. This tapioca starch is then used in making various food products. For example, the tapioca starch can be processed into balls which are used in making tapioca pudding or, as more commonly found in Asian regions, tea with tapioca.

In South America, particularly northern parts of Brazil, "Tapioca" actually refers to both a starchy tapioca flour and a wrap or crepe-like product made from the flour. More specifically, the tapioca starch is grinded to a fine powder or flour which is directly placed in a heated skillet with added water. The tapioca quickly melts together to take the form of a crepe which can be easily flipped, rolled or folded. The crepe-like products are somewhat popular snacks which can be eaten alone or filled with various fillings, such as grated coconut, cheese, banana and butter.

Certainly, the manner in which these crepe-like products are made does not lend itself to mass production. However, given the existence of somewhat similar products, like tortillas which are mass produced, the possibility to mass produce at least a similar product would be plausible. Of course, a particular hurdle would be to attempt to replicate a similar homemade-type product with mass production techniques.

SUMMARY OF THE INVENTION

The present invention relates to making products from tapioca. More specifically, the invention is concerned with making tapioca tortillas. Here, the term "tapioca tortilla" is employed given the similarities between the products produced and traditional tortillas which are common as wraps in making soft tacos, burritos, sandwiches and the like. In addition, the tapioca tortilla of the invention is designed to be mass produced utilizing certain technology currently associated with traditional tortillas. In particular accordance with the invention, the tapioca tortillas include both a tortilla base and an added tapioca particulate topping in order to establish a more homemade-style product in both texture and appearance. In general, a tapioca dough is created in a mixer, with the dough then being sheeted and cut into tapioca tortillas. The tapioca tortillas are then topped with tapioca granules to create the tapioca tortillas of the invention. The tapioca tortillas can be either topped with or filled with a variety of fillers, both sweet and savory.

In certain embodiments, the tortilla base is formed from a tapioca composition including approximately 40-55% tapioca, approximately 36-55% water, about 3-3.5% glycerin, about 1-1.5% salt, about 2-2.5% of a hydrocolloid such as xanthan gum, less than 1% of an emulsifier such as monoglycerides, and minor amounts of an enzyme (such as about 0.25% α-amylase), one or more preservatives (such as about 0.10% potassium sorbate) and, if the preservative is pH activated, a pH limiter (such as 0.05-0.10% citric acid), with all percentages being by weight of the composition. As for the added tapioca granules or particulates, desirable embodiments employ in the order of 200-400 grams of additional tapioca per each tortilla batch (noting a batch is generally in the order of 5-5.5 kg). Overall, this results in the addition of approximately 5-8 grams of tapioca granules per tortilla. In the most preferred embodiments, the additional tapioca was pre-hydrated with 5-10% water. Most preferably, the tapioca was mixed with water, sent through a grinder and then applied to the preformed tapioca tortilla through the use of a shaker belt arrangement. After being topped, the tapioca tortillas are directed through a roller unit, baked within an oven and cooled prior to being packaged.

Additional objects, features and advantages of the invention will become more readily apparent from the following detailed description of the invention when taken in conjunction with the drawings, which illustrate an exemplary embodiment of the invention wherein like reference numerals refer to corresponding parts in the various views.

DETAILED DESCRIPTION OF THE INVENTION

The current invention relates to tapioca tortillas, particularly soft tortilla bases made from tapioca with added tapioca granules or particulates. Throughout the specification and claims, percentages are by weight and temperatures in degrees Centigrade unless otherwise indicated. In addition, the term "about" connotes less than 1% variation, while the term "approximately" has a range of 1-5%. In addition, a recitation of an ingredient being provided in an amount "less than" a certain percentage, still requires the percentage to be greater than zero. As used herein, a "soft tortilla" means a fully cooked but non-fried tortilla product which remains soft at room temperature. By comparison, "tortilla dough" means uncooked or partially cooked product. The resulting tortilla is soft and can be cut into various shapes, including being oval, circular or even any polygonal shape, and then be later, further shaped. Regardless of the specific shape, a feature of the present tapioca tortillas is a thin walled construction characteristic of a tortilla, with a relatively flat lower surface and an undulating or textured upper surface due to the added tapioca granules or particulates. In addition, the tortillas can significantly vary in thickness. For example, wall thicknesses can range from about 1-5 mm, or more.

Figure 1:
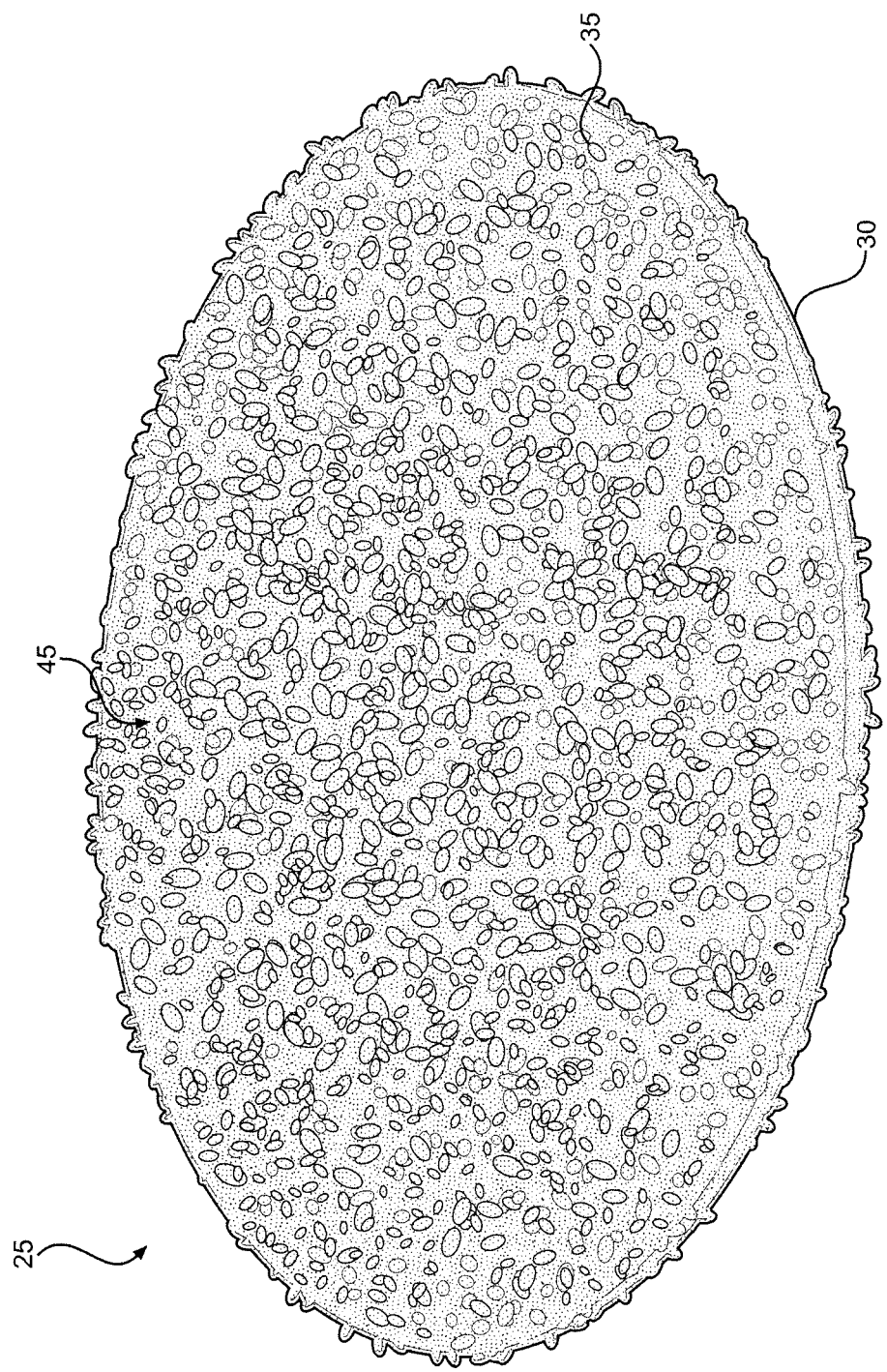
FIG. 1 is an upper perspective view of a tapioca tortilla made in accordance with the present invention.
Figure 2:
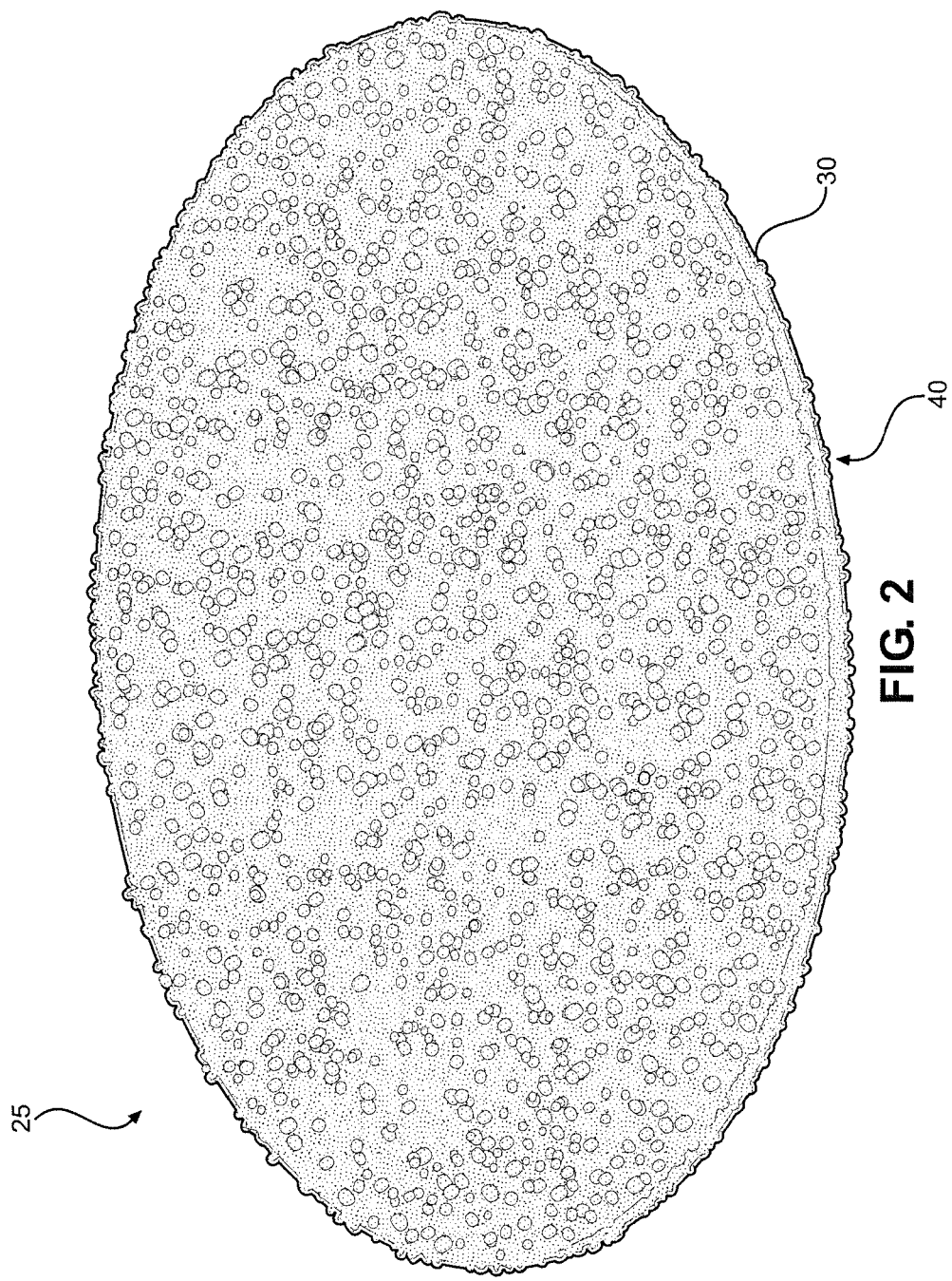
FIG. 2 is a lower perspective view of the tapioca tortilla of FIG. 1.

With initial reference to FIGS. 1 and 2, a tapioca tortilla constructed in accordance with the present invention is indicated at 25. In general, tapioca tortilla 25 includes a tortilla base 30 and a topping of tapioca granules or particulates 35. With this arrangement, a lower or bottom surface 40 of tapioca tortilla 25 is generally smooth, while an upper or top surface 45 is undulated or textured. Base 30 is created from a dough (note that a "dough" was established due to the granulation size employed but still did not have the extensibility of traditional doughs) formed from a composition including a tapioca composition including tapioca constituting approximately or about 40-60%, approximately or about 36-55% water, about 3-3.5% glycerin, about 1-1.5% salt, about 2-2.5% of a hydrocolloid such as xanthan gum, less than 1% of an emulsifier (preferably monoglycerides) to strengthen the dough, while improving mixing and handling tolerance, and minor amounts of an enzyme (such as about 0.25% α-amylase) to induce annealing, one or more preservatives (such as about 0.10% potassium sorbate) and, if the preservative is pH activated, a pH limiter (such as 0.05-0.10% citric acid), with all percentages being by weight of the composition. In a particularly preferred embodiment of the invention, base 30 is made from about: 55.72% tapioca; 35.94% water; 3.34% glycerin; 1.45% fine salt; 0.89% monoglycerides; 2.23% xanthan gum; 0.28% α-amylase; 0.10% potassium sorbate and 0.05% citric acid.

At this point, it should be noted that the tapioca may define native or unmodified starches. In other embodiments, the tapioca may define modified starches. Modified starches can be prepared by physically, enzymatically or chemically treating the native starch to change the properties of the starch. Large granulation tapioca is preferred.

As to the tapioca granules 35, as will be detailed more fully below, the granules 35 at the time of application on tortilla base 30 will range in size, such as ranging from 1 mm to less than 250 µm. Tapioca granules 35 can be un-hydrated and sprinkled on top of tortilla base 30 while being stuck to base 30 with the application of a water spray. However, in more preferred embodiments, tapioca granules 35 are pre-hydrated with water (about 5-20%) and then dispensed onto tortilla base 30, preferably in combination with moisture layer for adhesion purposes.

Figure 3:
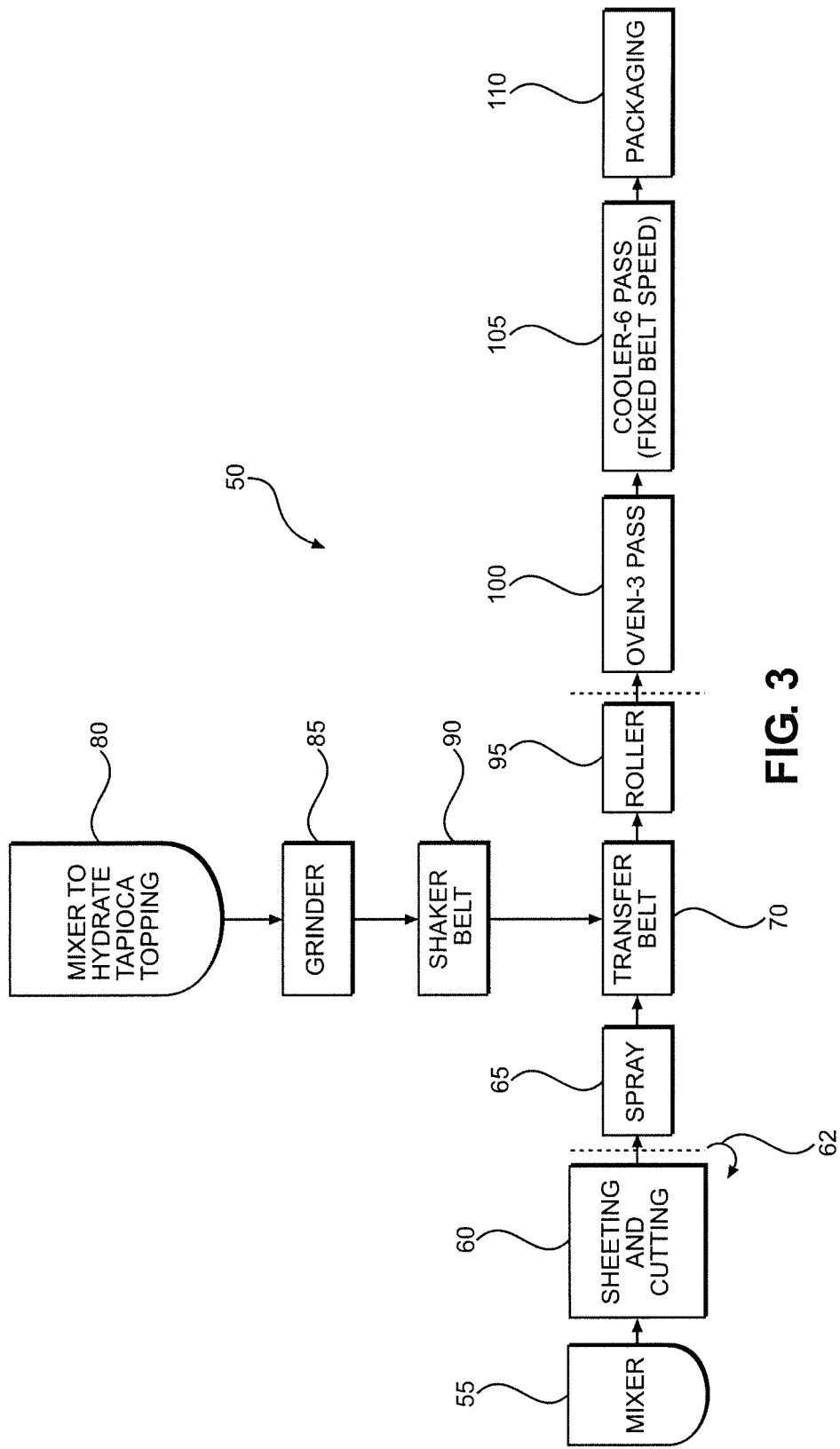
FIG. 3 is a schematic flow diagram illustrating the production of the tapioca tortilla of FIGS. 1 and 2.

Further details of the invention will now be set forth with particular reference to FIG. 3 which sets forth a schematic flow diagram 50 illustrating the production of tapioca tortillas 25. The tapioca dough used in making the tapioca tortillas 25 of the present invention is prepared by initially blending the dry ingredients in a mixer 55. The dry ingredients, including the tapioca, salt, emulsifier, hydrocolloid, preservative, acidifier and enzyme, are mixed, such as with a paddle mixer, at a low speed, such as about 30-35 rpms, for about two minutes. The remaining liquid ingredients (water and glycerin) are then added to mixer 55. The liquid and dry ingredients are then mixed in mixer 55 at the low speed for another 8-10 minutes to establish the proper tapioca dough rheology.

After being mixed, the tapioca dough is sent to a sheeting and cutting assembly 60. Out of sheeting and cutting assembly 60 come tortilla bases 30, which can take a variety of shapes but are preferably oval or round, generally having their largest dimension in the order of 10-25 cm. Excess dough from the cutting process is preferably recycled as indicated at 62. At this point, tortilla bases 30 have generally flat bottom surfaces 40, as well as corresponding upper surfaces which are sprayed at 65 with a liquid, preferably water or a water/sorbate solution, as the tortilla bases 30 pass to a transfer belt 70. It is upon transfer belt 70 that the tapioca granules 35 are provided upon tortilla bases 30, with the liquid from sprayer 65 enhancing the sticking of granules 35 on bases 30. More specifically, in accordance with an exemplary embodiment of the invention wherein the topping is hydrated with between 5-20% water prior to being applied to tortilla bases 30, tapioca particles are initially hydrated at 80 and grinded into smaller sized granules at 85. These steps can occur sequentially as indicated in FIG. 3 or the particles can be subjected to an initial grinding operation, hydrated and then further grinded. In any case, the result is the production of tapioca granules 35 which range in size from 1 mm to less than 250 µm. In accordance with one production run, about 32.3% were in the order of 1 mm, 31.3% in the order of 600 µm, 22.6% in the order of 250 µm and 13.9% less than 250 µm. Following grinder 85, the coarse tapioca granules 35 are directed to a shaker belt 90 which operates to distribute the tapioca granules 35 upon tortilla bases 30 to establish the undulated or textured top surface 45.

Next, topped tortilla bases 30 are directed through a roller unit 95 which softly presses tapioca granules 35 into the wraps or bases 30 and advantageously solidifies the texture before a cooking stage. At this point, each topped tortilla base 30 weighs in the order of 35-42 grams and is provided with about 7-8 grams of additional tapioca granules 35. Then tortilla bases 30 are directed through an oven 100. Although various different temperatures and residence times could be employed, a preferred embodiment provides for cooking at an oven temperature in the order of 220° C.-240° C. for just under a minute, e.g., approximately 55 seconds in an exemplary 3-pass oven. Thereafter, the resulting tapioca tortillas 25 are directed through a cooler 105 and then packaged at 110. Overall, the added tapioca granules 35 can end up constituting from approximately 5-10% of the final composition of the tapioca tortilla 25.

Based on the above, it should be apparent that the present invention establishes a tapioca tortilla having differently configured opposing main faces based on the two supplies of tapioca employed, specifically with the bottom being quite smooth and the top being undulating due the addition of the coarse granule topping. In general, it is considered that the tapioca tortilla of the invention has advantageous flavor, texture, appearance and color, as well as favorable stretch and rollability traits, while being made from a single starch source. By way of example, a tortilla produced in accordance with the particularly preferred embodiment outlined above had the following desirable properties a day after production: pH of 4.82; water activity ($A_w$) of 0.925; percentage moisture of 31.86; a toughness of 164.43 g; and an extensibility of 7.99 mm. In addition, the tortillas have been found to have a significant shelf life. Specifically, various packages were created for testing, with a plurality (8) wraps per flexible film package. The packages were divided and subjected to different storage conditions, including packages maintained frozen at −18° C. conditions, multiple packages stored at 23° C. and 50% relative humidity, multiple packages stored in a test chamber which was cycled between night/day conditions, and multiple packages stored at 32° C. at 75% relative humidity. In each case, the packaged tapioca tortillas maintained their favorable attributes for a tested storage period of at least 5 weeks. Still, even with the details presented above, it is to be understood that the examples and specified percentages set forth herein are for purposes of illustrating particular embodiments of the invention such that various modifications and additions can be made to the exemplary embodiments discussed without departing from the scope of the present invention.

The invention claimed is:
1. A tapioca tortilla comprising:
a tapioca tortilla base having upper and lower surfaces; and
tapioca granules added upon the upper surface of the tapioca tortilla base such that an upper surface of the tapioca tortilla is rough and undulated due to the tapioca granules, wherein more than half of the tapioca granules are at least 600 µm in size and each tapioca granule consists essentially of tapioca.

2. The tapioca tortilla of claim 1, wherein the bottom surface of the tapioca tortilla base lacks tapioca granules and is smooth as compared to the upper surface of the tapioca tortilla.

3. The tapioca tortilla of claim 1, wherein the tapioca granules are pressed into the tapioca tortilla base.

4. The tapioca tortilla of claim 1, wherein the tapioca granules vary in size.

5. The tapioca tortilla of claim 4, wherein the tapioca granules vary in size from about 1 mm to less than 250 µm.

6. The tapioca tortilla of claim 1, wherein the tapioca granules are pre-hydrated and wherein an entirety of each tapioca granule is tapioca.

7. The tapioca tortilla of claim 1, wherein approximately 5-8 grams of the tapioca granules are added upon the upper surface of the tapioca tortilla base and wherein the tapioca granules constitute approximately 5-10% of the tapioca tortilla.

8. The tapioca tortilla of claim 1, wherein the tapioca tortilla base is formed from dry and liquid components, the dry components including tapioca, salt, emulsifier, hydrocolloid and an enzyme, and the liquid ingredients including water and glycerin.

9. The tapioca tortilla of claim 8, wherein the tapioca tortilla base consists of tapioca, water, glycerin, salt, a hydrocolloid, monoglycerides, an enzyme, a preservative and a pH limiter.

10. The tapioca tortilla of claim 1, wherein the tapioca tortilla base has a composition of approximately 40-60% tapioca, approximately 36-55% water, about 3- 3.5% glycerin, about 1-1.5% salt, about 2-2.5% of a hydrocolloid, less than 1% of an emulsifier, about 0.25% of an enzyme, about 0.10% of at least one preservative, with all percentages being by weight of the composition.

11. The tapioca tortilla of claim 10, wherein the at least one preservative is pH activated and the composition of the tapioca tortilla base further includes about 0.05- 0.10% of a pH limiter.

12. The tapioca tortilla of claim 1 comprising at least two of: a pH of 4.82; a water activity ($A_w$) of 0.925; a percentage moisture of 31.86; a toughness of 164.43 g; and an extensibility of 7.99 mm.

13. A method of preparing a tapioca tortilla comprising:
sheeting and cutting a dough made from tapioca into individual tapioca tortilla bases, each having upper and lower surfaces;
adding tapioca granules upon the upper surfaces of the tapioca tortilla bases, wherein more than half of the tapioca granules are at least 600 µm in size and each tapioca granule consists essentially of tapioca;
pressing the tapioca granules into the tapioca tortilla bases; and
cooking the tapioca tortilla bases with the tapioca granules to form tapioca tortillas, with an upper surface of each tapioca tortilla being rough and undulated due to the tapioca granules.

14. The method of claim 13, further comprising: wetting the tapioca tortilla bases prior to adding the tapioca granules upon the upper surfaces of the tapioca tortilla bases.

15. The method of claim 14, further comprising: pre-hydrating the tapioca granules prior to addition upon the upper surfaces of the tapioca tortilla bases.

16. The method of claim 13, wherein approximately 5-8 grams of the tapioca granules are added upon the upper surface of each of the tapioca tortilla bases.

17. The method of claim 13, further comprising: forming the dough for the tapioca tortilla bases from dry and liquid components, the dry components including tapioca, salt, an emulsifier, a hydrocolloid and an enzyme, and the liquid ingredients including water and glycerin.

18. The method of claim 17, wherein the dough for the tapioca tortilla base consists of tapioca, water, glycerin, salt, a hydrocolloid, monoglycerides, an enzyme, at least one preservative, and a pH limiter.

19. The method of claim 18, further comprising: forming the dough from a composition of approximately 40-60% tapioca, approximately 36-55% water, about 3-3.5% glycerin, about 1-1.5% salt, about 2-2.5% of the hydrocolloid, less than 1% monoglycerides, about 0.25% of the enzyme, about 0.10% of the at least one preservative, and about 0.05-0.10% of the pH limiter, with all percentages being by weight of the composition.

20. The method of claim 13, further comprising: forming the tapioca tortilla to have at least two of: a pH of 4.82; a water activity ($A_w$) of 0.925; a percentage moisture of 31.86; a toughness of 164.43 g; and an extensibility of 7.99 mm.

* * * * *